United States Patent [19]

Franks et al.

[11] 4,361,765
[45] Nov. 30, 1982

[54] TERNARY LIQUID SCINTILLATOR FOR OPTICAL FIBER APPLICATIONS

[75] Inventors: Larry A. Franks; Stephen S. Lutz, both of Santa Barbara, Calif.

[73] Assignee: The United States of America as represented by the United States Department of Energy, Washington, D.C.

[21] Appl. No.: 269,234

[22] Filed: Jun. 1, 1981

[51] Int. Cl.³ .................. G01J 1/16; C09K 11/06
[52] U.S. Cl. ................ 250/486.1; 250/483.1; 252/301.17
[58] Field of Search ............. 252/301.17; 250/483, 250/486

[56] References Cited

U.S. PATENT DOCUMENTS

| | | | |
|---|---|---|---|
| 3,444,089 | 5/1969 | Carter et al. | 252/301.17 |
| 3,457,180 | 7/1969 | Kretz et al. | 252/301.17 |
| 3,600,445 | 8/1971 | Wirth et al. | 568/633 |
| 3,644,211 | 2/1972 | Heller | 252/301.17 |
| 3,673,100 | 6/1972 | Benson | 252/301.17 X |
| 3,677,964 | 7/1972 | Webb | 252/364 |
| 3,711,421 | 1/1973 | Krumbiegel et al. | 252/408 |
| 3,886,082 | 5/1975 | Hyman | 252/301.17 |
| 3,928,227 | 12/1975 | Sena et al. | 252/301.17 |
| 3,939,094 | 2/1976 | Kauffmann | 252/301.17 |
| 3,951,847 | 4/1976 | Hyman | 252/301.17 |
| 3,984,332 | 10/1976 | Nelson et al. | 250/368 |
| 3,991,318 | 11/1976 | Duguay | 250/578 |
| 4,001,139 | 1/1977 | Long | 252/301.17 |
| 4,017,738 | 4/1977 | Hyman et al. | 250/482 |
| 4,127,499 | 11/1978 | Chen et al. | 252/301.17 |

OTHER PUBLICATIONS

Kallman et al., Scintillation Digest, vol. 8, No. 3, pp. 32-39, (Mar. 1951).

*Primary Examiner*—F. Edmundson

[57] ABSTRACT

A multicomponent liquid scintillator solution for use as a radiation-to-light converter in conjunction with a fiber optic transmission system. The scintillator includes a quantity of 5-amino-9-diethylaminobenz (a) phenoxazonium nitrate (Nile Blue Nitrate) as a solute in a fluor solvent such as benzyl alcohol. The use of PPD as an additional solute is also disclosed. The system is controllable by addition of a suitable quenching agent, such as phenol.

8 Claims, 4 Drawing Figures

TERNARY LIQUID SCINTILLATOR FOR OPTICAL FIBER APPLICATIONS

The invention described herein was made in the course of Contract DE-AC08-76NV01183 with the U.S. Department of Energy.

TECHNICAL FIELD

This disclosure relates to liquid scintillator systems meeting the requirements of long wavelength emission and short impulse response necessary for long path, wide bandwidth optical fiber applications. Such systems are used for radiation detection and transmission of intelligence in the form of light pulses corresponding to the radiation. The system is characterized by a new radiation-to-light converter of the type commonly called a "fluor" or a scintillator.

BACKGROUND ART

Low loss optical fibers are finding increasing application in plasma diagnostics, particularly when immunity to electromagnetic interference and wide bandwidth are required. The fibers normally serve to transmit a light pulse, generated in a radiation-to-light converter, to a remote photodetector. Under some conditions, Cerenkov light generated by relativistic electrons in the fiber itself suffices to characterize the radiation environment. An example of such a system is described in U.S. Pat. No. 3,984,332, issued Oct. 5, 1976. This disclosure is concerned with the more general case where the light is generated in a liquid or plastic scintillator.

In numerous applications where it is necessary to observe and characterize ionizing radiation the radiation detection system utilized can be thought of as comprising three basic functional units. First, the radiation is detected; second, a signal of some kind produced by the detector in response to the radiation is transmitted to a remote location; and third, the transmitted signal is utilized to produce a recording and/or display or is otherwise processed to provide information about the radiation. It is apparent that errors introduced into the system by any of the functional units will affect the ability of the system to accurately characterize the observed radiation.

The detection of radiation is commonly accomplished utilizing a transducer which responds to the radiation in a manner which can be used to generate an electrical signal corresponding to some characteristic of the radiation. The electrical signal is transmitted over electric cables, commonly coaxial cables, to a location remote from the transducer for processing. However, the transmission characteristics of coaxial cables are such that significant distortion of information can occur, particularly in pulses of duration shorter than about 5 nsec.

The advent of commercially available fiber optic wave guides, commonly called optical fibers, has stimulated interest in their practical application to intelligence gathering and transmitting systems. Since the fibers have inherently greater information-carrying capacity than coaxial cables, their use as signal-carrying means in place of coaxial cables is, potentially, very attractive. With respect to systems for detecting and transmitting intelligence regarding radiation, U.S. Pat. No. 3,984,332 to Melvin A. Nelson, Terence J. Davies, and John R. Morton, III, assignors to the assignee of the instant application, of interest. That patent, entitled "Radiation Detection System," is directed to a system wherein the optical fiber serves as both the detector and the transmission means. Cerenkov light generated in a light guide by charged particle radiation is transmitted along the guide to a remote location for processing.

The optical transmission and material dispersion characteristics of known fiber optic wave guides vis-a-vis the output characteristics of known transducers which convert radiation to light have impeded the development of practical systems wherein the optical fibers serve only as the transmission means. This has been particularly true when requirements of the radiation detection system combine wide bandwidth with long transmission lengths, i.e., bandwidths greater than about 50 MHz and lengths greater than about 300 m. Such practical systems require radiation-to-light converters having emission wavelengths long enough to minimize absorption in the fiber which varies approximately as $1/\lambda^4$ where $\lambda$ is the wavelength. In addition, where the radiation to be detected is a very fast transient pulse, such as occurs in connection with a nuclear explosion, it is necessary for diagnostic purposes that the decay time of the light emission be very short, less than a few nanoseconds for some purposes.

Presently available long wavelength fluors (500 to above 600 nm) have decay times in excess of about 15 ns. This places serious bandwidth limitations on a fluor-fiber system. On the other hand, commercial fluors which do have short decay times have emission maxima less than about 430 nm.

In copending patent application Ser. No. 949,163, filed Oct. 6, 1978, now U.S. Pat. No. 4,292,527, which is hereby incorporated into the disclosure by reference, there is described a radiation detection system which uses a radiation-to-light converter in combination with an optical fiber that transmits light produced by the converter to a remote location for recording, display and other processing steps. This disclosure also describes several fluors suitable for use in radiation detection systems which utilize optical fibers as a means to transmit information regarding the radiation. These radiation-to-light converters produce light having characteristics peculiarly matched to the transmission characteristics of optical fibers.

For wide bandwidth over extended transmission paths, long wavelength emission and short decay time in the scintillator are essential for optimal performance. While the exact scintillator parameters are dictated by a specific application, minimum requirements are considered to be 500 nm emission, a response (full width at half maximum, FWHM) to a delta function input of about 2 ns, and conversion efficiency comparable to conventional plastic scintillators. While progress has been made in developing such scintillators, as evidenced by the disclosure of patent application Ser. No. 949,163, a scintillator optimized for fibers is not yet commercially available.

This disclosure relates to a liquid scintillator system based on use of 5-amino-9-diethylaminobenz (a) phenoxazonium nitrate, commonly known as Nile Blue Nitrate. It provides temporal characteristics comparable to conventional "blue scintillators" in long wavelength emitting scintillators and provides relatively high efficiencies.

DISCLOSURE OF INVENTION

The present invention comprises a scintillator capable of performing as a radiation-to-light converter in combination with an optical fiber, wherein the scintillator is composed of Nile Blue Nitrate and PPD (2, 5 Diphenyl 1, 3, 4 oxadiozole) as a solute in a suitable solvent system.

It is an object of the invention to provide a scintillator which generates light in response to radiation, for practical transmission through optical fibers.

Another object of this invention is to provide a scintillator having the long wavelength emission and short decay time required for optimal performance in transmission of light pulses through optical fibers.

BEST MODE FOR CARRYING OUT THE INVENTION

Figure 1:
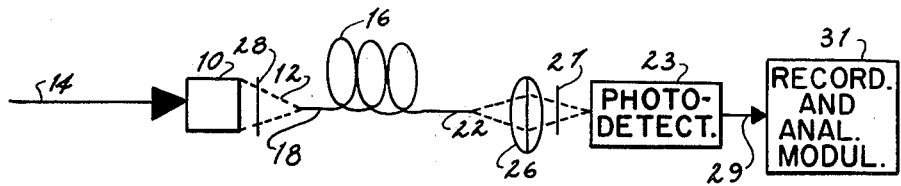
FIG. 1 is a schematic representation of a radiation detection system for use in conjunction with the scintillators.

Referring now to FIG. 1, which schematically illustrates the system, a radiation-to-light converter 10 emits light 12 when subjected to radiation 14. A substantial portion of the emitted light 12 should be at a wavelength greater than 500 nm and have a decay time less than about 2 ns in order to provide an appropriate match with the optical transmission characteristics of fiber optic wave guide 16. Emitted light 12 is received at one end 18 of guide 16, transmitted therethrough and emitted at the other end 22. It is then detected by a suitable photodetector 23 after suitable processing, such as by lens 26 and filter 27, if desired. A filter 28 between fluor 10 and fiber receiving end 18 in place of, or in addition to, filter 27 may be preferable in some applications. The output 29 of photodetector 23, which is representative of radiation 14, is then available for display, recording, analysis, and/or other processing, such as by recording and analysis modules 31.

The constituents of the fluors or scintillators for the radiation-to-light converter 10 utilizes Nile Blue Nitrate as a solute, together with PPD and an available solvent, such as benzyl alcohol.

The scintillator described herein was excited during experimental tests with 50-psec (FWHM) bursts of 6-MeV electrons at 360 pps from an L-band linear accelerator (LINAC). Peak electron currents used during the measurements typically ranged from 50 to 500 mA.

Actual experiments utilizing the scintillator were performed with the scintillator contained in either 2 cm diameter by 1 cm long fused silica cells or 2 mm ID by 5 cm long fused silica tubes. The fluorescent emissions were collected by a 3 m length of 1 mm core diameter plastic clad silica fiber (from Quartz Products Corporation of Plainfield, NJ) placed 135° from the direction of the beam. This viewing angle was selected to minimize the contribution of Cerenkov radiation to the detected signal. An f/4.2 monochromator was used to spectrally analyze the fluorescens. A 600 lines/mm grating and 2 mm slits were employed which gave a special resolution of approximately 16 nm. Electron excited emission spectra were recorded by remotely scanning the monochromator while sampling the peak of the temporal pulse. The wavelength response of the entire optical system was determined by placing the optical fiber directly in the electron beam at an angle of approximately 47° and recording the Cerenkov emission intensity as a function of wavelength and using its $1/\lambda^3$ wavelength dependence as a correction factor. Relative sensitivity ratios between experimental setups were obtained by measuring a standard scintillator, NE-108 (from Nuclear Enterprises, Inc., of San Carlos, CA) at 570 nm. Variations in electron beam current were recorded by measuring the charge collected on a Faraday cup placed in the beam directly behind the scintillator cell.

Photomultiplier detectors were utilized in the course of the measurements to monitor the spectral and bandwidth characteristics of the various concentrations of the scintillator. The photomultiplier detector outputs were recorded on a sampling oscilloscope and processed on an associated analysis system or a real time (1 gHz bandwidth) oscilloscope.

EXAMPLE

Figure 2:
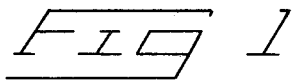
FIG. 2 illustrates the emission spectrum of the scintillators.

A ternary liquid scintillator system was prepared using Nile Blue nitrate ($5 \times 10^{-4}$ molar) and PPD (2, 5 Diphenyl 1, 3, 4 oxadiazole—0.10 molar) in benzyl alcohol. The proportions were adjusted to near optimal at room temperature by observing the peak amplitude of the LINAC-stimulated fluorescence. A corrected emission spectrum of the solution under LINAC excitation is shown in FIG. 2. The temporal data were taken using a narrow band interference filter with a central wavelength of 700 nm and a full width (at 50% of the maximum transmission) of 13 nm.

Decay time and relative intensity measurements were made with and without phenol (4% by weight) added as a quenching agent. In addition, both the quenched and unquenched systems were heated to 156° C. to examine the combined effects of foreign molecule and thermal quenching.

Figure 3:
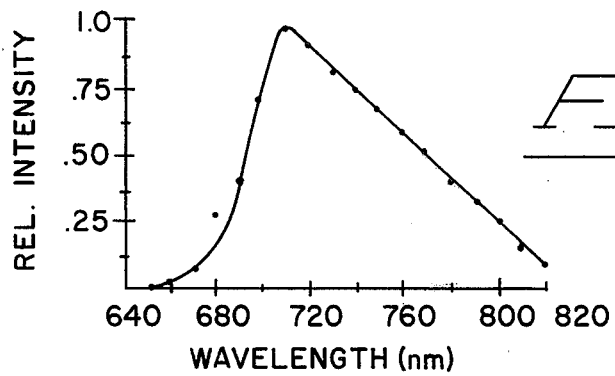
FIG. 3 illustrates changes in relative efficiency with respect to temperature and addition of a quenching agent.
Figure 4:
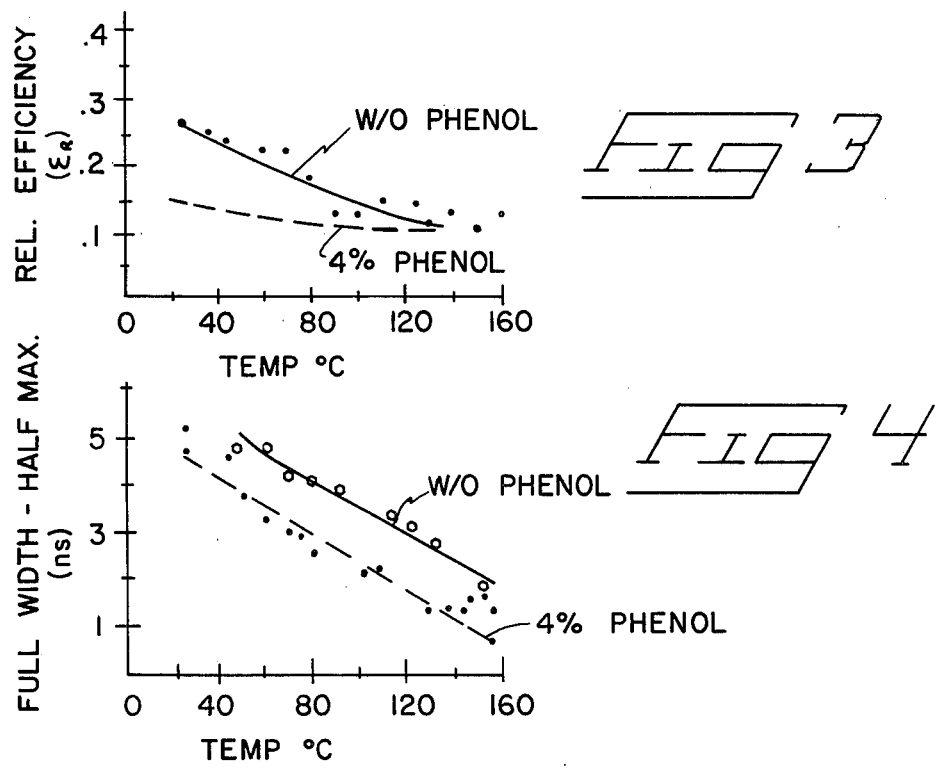
FIG. 4 illustrates FWHM changes with respect to temperature and a quenching agent.

The results are summarized in FIGS. 3 and 4 where the relative intensity and FWHM, respectively, are compared for samples with and without phenol. FIG. 3 shows the relative intensity as a function of temperature. At room temperature the phenol is seen to cause an approximately 50% reduction in intensity but compared to the solution without phenol had progressively less effect with increasing temperature. FIG. 4 shows the FWHM of the two systems as a function of temperature. It should be observed that the FWHM of the phenol-containing fluors is narrower at room temperature due to the normal phenol quenching effect, and decreases with the increasing temperature at a rate at least as great as that for the sample without phenol. The apparent flattening of the lower curve is due to the increasing contribution of the system response. This is demonstrated by the datum (600 psec) at 152° C. obtained with a wider bandwidth sampling oscilloscope system.

What is claimed is:

1. A radiation-to-light converter comprising a combination of a fluor solvent and at least one fluor solute, wherein said one solute is 5-amino-9-diethylaminobenz (a) phenoxazonium nitrate.

2. A radiation-to-light converter as set out in claim 1 wherein the solvent is benzyl alcohol.

3. A radiation-to-light converter as set out in claim 1 further comprising a quantity of PPD.

4. A radiation-to-light converter as set out in claim 1 further comprising a quenching agent.

5. A radiation-to-light converter as set out in claim 4 wherein the quenching agent is phenol.

6. A method of detecting and measuring ionizing radiation comprising exposing to ionizing radiation a measured solution containing 5-amino-9-diethylaminobenz (a) phenoxazonium nitrate and transmitting the resulting light pulses through an optical fiber.

7. A method as set out in claim 6 wherein the solution further contains PPD.

8. A method as set out in claim 6 wherein the solution further contains a quenching agent.

* * * * *